(No Model.)
T. T. MILLER.
SEEDING MACHINE.
No. 322,952. Patented July 28, 1885.
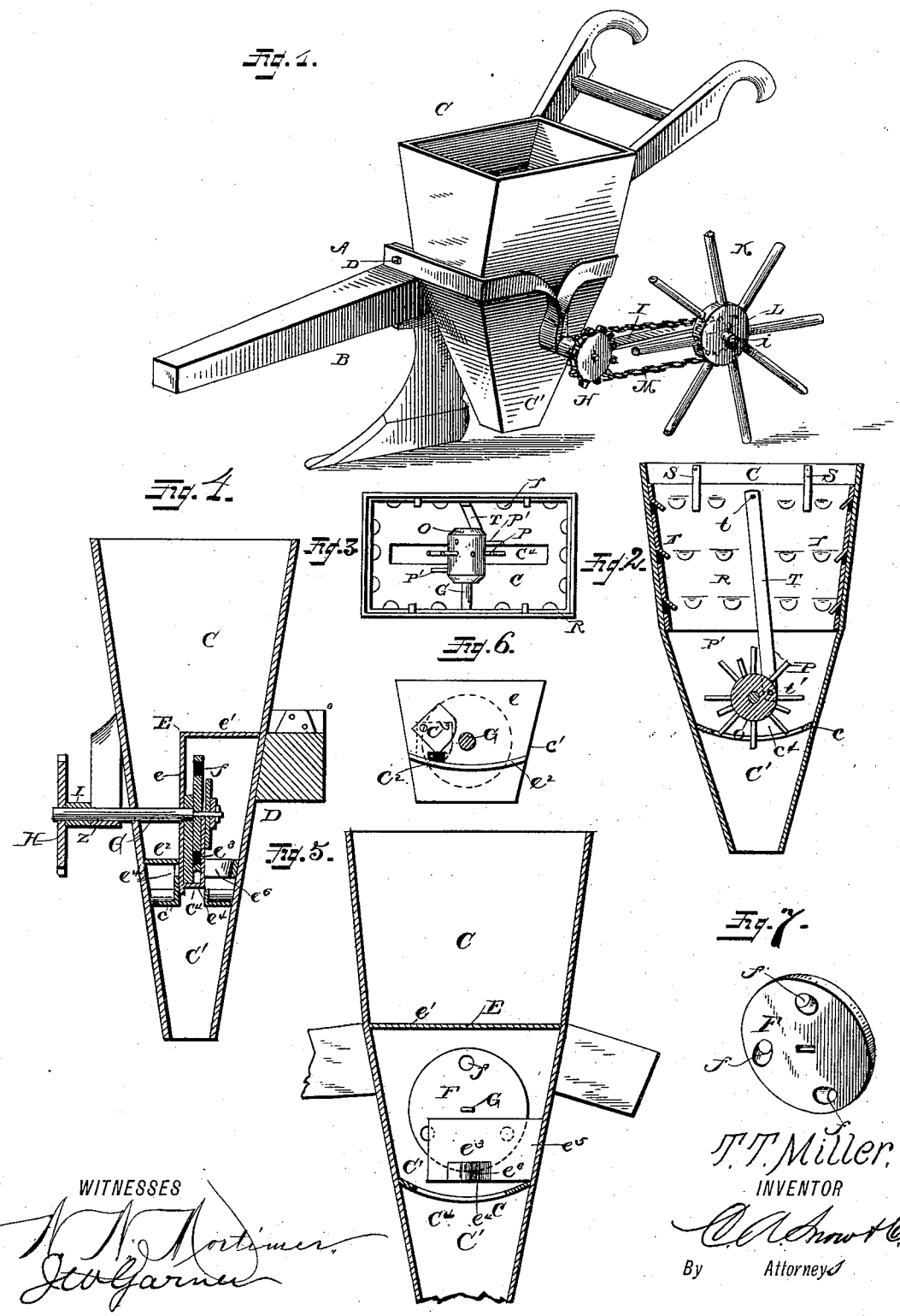
WITNESSES
T. T. Miller,
INVENTOR
By Attorneys

UNITED STATES PATENT OFFICE.

TEDOR T. MILLER, OF HICO, TEXAS.

SEEDING-MACHINE.

SPECIFICATION forming part of Letters Patent No. 322,952, dated July 28, 1885.

Application filed July 1, 1884. (No model.)

*To all whom it may concern:*

Be it known that I, TEDOR T. MILLER, a citizen of the United States, residing at Hico, in the county of Hamilton and State of Texas, have invented a new and useful Seeding-Machine, of which the following is a specification, reference being had to the accompanying drawings.

My invention relates to an improvement in seeding-machines; and it consists in the peculiar construction and combination of devices that will be more fully set forth hereinafter, and particularly pointed out in the claims.

Figure 1 is a perspective view of my invention. Fig. 2 is a vertical sectional view taken through the hopper. Fig. 3 is a top plan view. Figs. 4, 5, 6, and 7 are detailed views of a corn-planting attachment.

A represents a plow of suitable construction, and to the left side of the beam B of this plow is secured a hopper, C, as at D. The hopper is formed with inclined sides, and has a lower extension, C', that forms a seed-tube for conducting the seed to the furrow.

G represents a horizontal shaft that has its bearings in a sleeve, $z$, on the outer side of the hopper, and in the outer side or wall thereof.

To the outer end of the shaft G is keyed a sprocket-wheel, H, and in between the sprocket-wheel and the sleeve $z$ an arm, I, is hinged to the shaft. The rear free end of this arm has a spindle, $i$, on which is mounted a walking-wheel, K, having a sprocket-wheel, L, secured to its hub. A sprocket-chain, M, connects the wheels H and L. The hopper is provided with a curved bottom, $c$, which has a slotted central opening, $c^4$.

To the inner end of the shaft G is secured a hub, O, which is provided at its center with radial stirrers P, that project through the slotted opening in the bottom of the hopper, as shown. Auxiliary stirrers P' are secured to the ends of the hub, and are of sufficient length to just about reach the upper side of the bottom of the hopper on opposite sides of its slotted opening $c^4$. In the hopper is placed an agitator or packer, R, which extends along one side and across both ends of the hopper for a distance equal to about the height thereof, and this packer is provided with a series of rows of downwardly and inwardly projecting teeth, $r$. Guides S are secured to the inner face of the hopper, near its upper end, for the upper side of the packer, and a connecting-rod, T, is pivoted to the packer, as at $t$, and has its lower end eccentrically pivoted to the inner end of the hub O, as at $t'$. As the plow is drawn along the walking-wheel furnishes motive-power, which is communicated to the shaft G by the mechanism described, as will be readily understood. The rotation of the shaft G causes the packer to reciprocate vertically in the hopper, which forces the cotton-seed downwardly therein, and the stirrers discharge the cotton-seeds through the slotted opening in the bottom of the hopper, from whence they fall through the discharge-spout into the ground.

The mechanism hereinbefore described, and which constitutes the essential features of my invention, is adapted for use in planting cotton-seeds.

In Figs. 4, 5, 6, and 7 I illustrate devices that are adapted to be substituted for the cotton-planting mechanism and equip the machine for use as a corn-planter. When so employed, the packer is removed from the hopper and the hub from the shaft G, and in the hopper, a little below the center thereof, is placed a removable partition, E, which consists of a central vertical wall, $e$, a horizontal plate, $e'$, at its upper end, which extends to one side of the hopper, and a curved bottom plate, $e^2$, which extends from near the lower edge of the central wall to the side of the hopper opposite to that to which the plate $e'$ extends. This curved plate rests on the curved bottom of the hopper. A wall, $e^3$, is arranged parallel with the wall $e$, beneath the plate $e'$, and is connected to the wall $e$ by the bottom flange, $e^4$, and side flange, $e^5$. The wall $e^3$ extends nearly across the hopper, a space or opening, $c'$, being left on one side between it and the side of the hopper. The wall $e^3$, with its bottom and side flanges, forms a recess, in which is placed a vertical seed-disk, F, that is secured on the inner end of the shaft G. An opening, $c^2$, is made in the wall $e$, on the side opposite to the opening $c'$, and communicates with the curved bottom plate, $e^3$. A slide, $c^3$, is pivoted to the wall $e$, and regulates the size of the opening $c^2$, and serves to close said opening, if desired. The seed-disk is provided with openings $f$, which are larger on the side next the partition wall than they are on the opposite side.

When the machine is operated, the corn in the hopper enters, a few grains at a time, through the opening $c^2$ into the openings in the seed-disk, and is retained in said openings by the partition-wall $e$ and wall $e^3$ during a part of the rotation of the seed-disk and until the openings pass the outer edge of the wall $e^3$, when the seeds drop through the openings $c'$ $c^4$ into the discharge-spout, and are thereby conveyed to the furrow. The abutment $e^6$, which extends from one side of the wall, $e^3$, bears against the inner side of the hopper and assists in holding the partition in place therein.

Having thus described my invention, I claim—

1. In a seed-planter, the hopper having the open bottom, in combination with stirrers working above and through the opening of the bottom, and a packer arranged to reciprocate in the hopper above the stirrers, as set forth.

2. In a seed-planter, the hopper having the open bottom, in combination with a shaft journaled in the hopper above the bottom, stirrers located on the shaft and working through the said bottom, a packer working vertically within the hopper above the stirrers, and a connecting-rod attached to the packer and secured to the hub of the stirrer, as set forth.

3. In a seed-planter, the combination, with the hopper, of the packer-frame corresponding in form thereto and made smaller in size so as to fit within the hopper, said packer-frame working vertically against the several sides of the hopper so that the seed will be worked evenly downward from all portions of the same, as set forth.

In testimony that I claim the foregoing as my own I have hereto affixed my signature in presence of two witnesses.

TEDOR T. MILLER.

Witnesses:
W. R. BYRD,
R. L. ALFORD.